Figure 1:
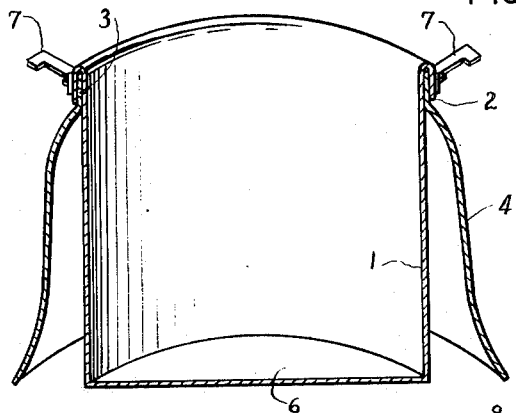

United States Patent Office 3,209,746
Patented Oct. 5, 1965

3,209,746
KITCHEN POT HAVING HEAT CONCENTRATING AND INSULATING THERMAL BELL
Fronza Giuseppe, Via Cavour 34, Trento, Italy
Filed Dec. 17, 1963, Ser. No. 331,167
Claims priority, application Italy, Jan. 5, 1963, 46/63
3 Claims. (Cl. 126—381)

It is well known that the kitchen pots so far in use present the inconvenience of exploiting only the calories generated from the direct contact of the bottom with the heat source, with the consequent dispersion and waste of the heat energies through the uncovered parts of the pot itself.

The present invention is meant to obviate such inconvenience and its object is a pot for cooking both solid and liquid foodstuffs as well as sterilization and washing, and of exploiting totally the heat throughout the receptacle walls and lid in order to achieve in the least possible time the cooking operation, being the pot essentially constituted by an inner container surrounded by an insulating thermal heat concentrating bell which is connected to the pot in its upper section so as to form a static hot air chamber having an upwards propagation of the heat, and by a lid divided into sections so as to form at least two chambers one of which is in contact with the inner receptacle, tightly closed and heat insulating; the other air chamber, on top, condensing the steam which penetrates into said chamber, by means of a valve, and returning into the pot in the liquid form, whilst the surplus of the not condensed steam goes out through the lid by means of a second valve.

The pot, according to the invention, when placed on the heat source, allows all the heat to be in direct contact with the base of the receptacle as well as with its walls and, through thermal exchange, to be circulating within the receptacle itself. There ensues a heat concentration favouring the cooking of the contents and provoking the vaporization of the liquid part contained in any food, even if solid. The lid, owing to its own weight and forced fitting, will slightly compress the steam contained in the receptacle thereby increasing its temperature and yielding a certain number of calories destined to increase the concentration of the existing heat.

From the above description it can be realized that the cooking occurs very fast and thoroughly, whilst at the same time there occurs an automatic stirring of the food apt to exclude the ordinary manual stirring.

For foodstuffs requiring a short cooking time, it is possible to reach the cooking point by making use of the heat accumulated in the annular air space closed at the top and opening downwards in the bell-wise way.

Placing a grate on the kitchen-pot bottom, solid food can reach a uniform cooking without adding any liquid which would subtract from the food its vitaminic contents and original flavour.

The functioning of the pot forming the object of the present invention, is free from any danger since it is always possible to take off the lid in case of possible overpressure and then, replacing it, to recreate immediately the conditions of the thermal insulating bell. Whenever for any reason whatsoever the air valves should get jammed, a slight oscillation of the lid will allow the steam to go out.

Another advantage consists in that the pot structure prevents the flame from extinguishing itself owing to the liquid overflowing from the pot, inasmuch as this liquid, will lap the external part of the bell thus getting away from the flame when reaching the bell base, thereby avoiding any danger to the user.

According then to a variation, the bells can be more than one for each pot and inserted coaxially one into the other, surrounding the pot so as to create as many annular hollow spaces as the bells are, that is to say a plurality of hot air chambers in order to avoid as much as possible the heat dispersion.

The attached drawings illustrate just as a schematic and not limiting example, a favourite form of realization of the kitchen pot according to the invention, plus one variation.

Figure 2:
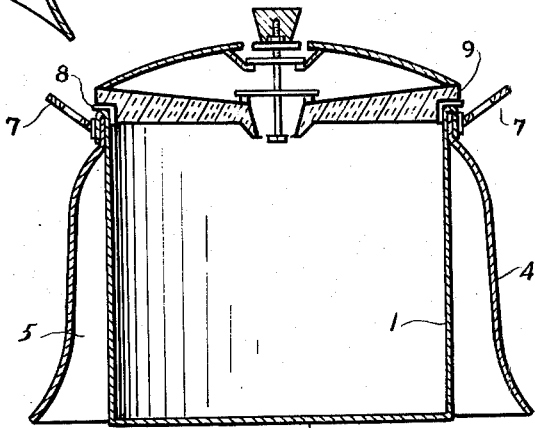
Figure 3:
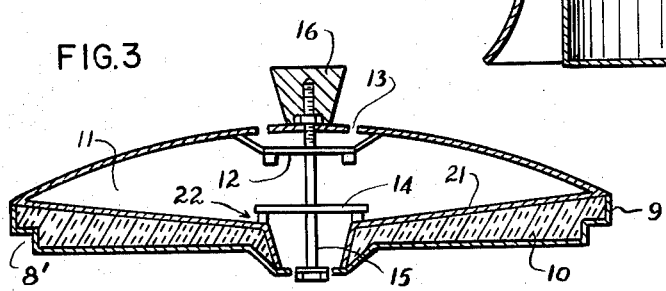

FIGURES 1 to 3 represent the first form of realization, in which: FIG. 1 shows the pot in its perspective axial section, without the lid; FIG. 2 represents the same pot in its vertical axial section and fitted with the lid; FIG. 3 is an enlarged axial section of the lid.

Figure 4:
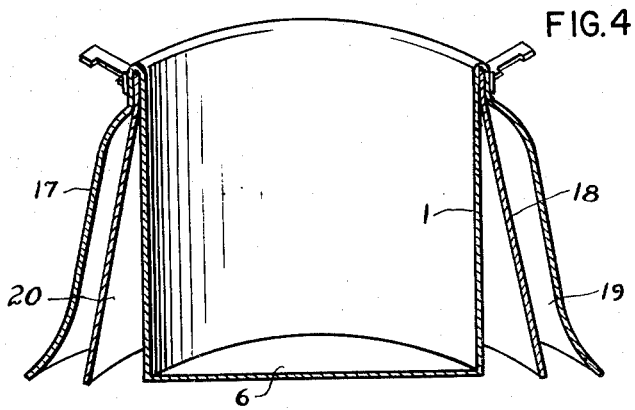

FIG. 4 represents the pot in its perspective axial section according to the variation.

Referring to FIGURES 1–3, there is shown a kitchen pot for cooking foodstuffs comprising a central open-topped receptacle 1, here shown in cylindrical form. A thermal bell 4 is affixed to the receptacle at the upper end thereof as, for example, by turning over the edge 2 of the receptacle to enclose, in securing relationship, the upper edge 3 of the thermal bell. The thermal bell flairs outwardly and downwardly from said affixed position to form a chamber 5 entrapping heated air about said receptacle.

The thermal bell extends downwardly substantially to the plane of the bottom 6 of the receptacle. Handles 7 are affixed to the edge 2 of the receptacle.

A lid 9 is provided for removably covering the open end of said receptacle. The lid is provided with a first chamber 10 which is filled with heat insulating material and a second chamber 11 positioned on top of said first chamber. The lid is fitted to the pot and engaged thereto by a packing or gasket 8 fitted on the shoulder 8' of the lid.

A substantially centrally located aperture communicates between the receptacle and said second chamber and said second chamber and the atmosphere. A valve 12 and valve 14 are mounted on a screw 15 which threadably engages the knob 16 of the lid 9. The weight of the knob restrains movement of the valves. Thus, the steam rising from the receptacle passes through the apertures 22 into the second chamber where the steam is condensed, returning through the aperture by virtue of the inclination of the lower plane 21 of the second chamber to return the condensate to the receptacle. Should the pressure in the receptacle build up, it will displace the valve 12, venting the excess pressure of heated air and steam to the atmosphere. The pressure at which the valve 12 operates is determined by the weight of the knob 16 bearing thereon.

In the variation of FIG. 4 the pot 1 is surrounded by two lateral bell-wise walls 17 and 18, closed and connected to the pot in their upper section, thus forming two annular hollows 19 and 20, that is to say two hot air chambers such as to reduce to the minimum any heat dispersion.

It is evident that, according to the present invention, the form of the pot, lid, bell and of all the constructive details constituting them, as well as the material employed can always be changed in order to allow different practical applications and without impairing the invention originality.

What I claim is:
1. A kitchen pot for cooking foodstuffs comprising a central open-topped receptacle, a thermal bell affixed to said receptacle at the top of said receptacle and flaring outwardly and downwardly from said affixed position to form a chamber entrapping heated air about said receptacle, a lid removably covering said open end of said receptacle, said lid having a first chamber and a second chamber, said first chamber being filled with insulation and positioned in contact with said receptacle, said second chamber being positioned on top of said first chamber, a substantially centrally located aperture communicating between said receptacle and said second chamber to permit passage of steam from said receptacle into said second chamber where said steam is condensed, the condensate returning to said receptacle through said aperture, and a valve communicating between said second chamber and the atmosphere, said valve operating when the pressure in said receptacle exceeds a predetermined pressure to vent the excess pressure of heated air and steam to the atmosphere.

2. A pot in accordance with claim 1 in which said valve comprises a seat in said second chamber and a weighted check valve resting thereon, the weight of said check valve determining the predetermined pressure build-up before displacement of said valve from said seat to vent said pressure from said second chamber.

3. A pot in accordance with claim 1 which includes a second thermal bell coaxially positioned with respect to said first thermal bell.

References Cited by the Examiner

UNITED STATES PATENTS

| 173,448 | 2/76 | Davis | 126—381 X |
|---|---|---|---|
| 382,595 | 5/88 | Egerton | 126—381 X |
| 1,810,860 | 6/31 | Tremblay | 126—384 X |

FOREIGN PATENTS

| 790,118 | 9/35 | France. |
|---|---|---|
| 214,808 | 10/09 | Germany. |

FREDERICK L. MATTESON, Jr., *Primary Examiner.*
ROBERT A. DUA, JAMES W. WESTHAVER,
*Examiners.*